(12) United States Patent
Carey et al.

(10) Patent No.: US 11,873,867 B1
(45) Date of Patent: Jan. 16, 2024

(54) MODULAR ACTUATION SYSTEM FOR AN ELECTRIC VEHICLE TRANSMISSION

(71) Applicant: GM Global Technology Operations LLC, Detroit, MI (US)

(72) Inventors: Clinton E. Carey, Highland, MI (US); Dongxu Li, Troy, MI (US); Edward W. Mellet, Rochester Hills, MI (US); Bret M. Olson, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/172,446

(22) Filed: Feb. 22, 2023

(51) Int. Cl.
  *F16D 25/0638* (2006.01)
  *F16D 25/10* (2006.01)

(52) U.S. Cl.
  CPC ......... *F16D 25/0638* (2013.01); *F16D 25/10* (2013.01)

(58) Field of Classification Search
  CPC ...... F16D 25/0638; F16D 13/70; F16D 25/10; F16D 13/648
  See application file for complete search history.

(56) References Cited

U.S. PATENT DOCUMENTS

| | | | | |
|---|---|---|---|---|
| 3,362,481 A | * | 1/1968 | Steinhagen | F16D 25/0638 192/106 F |
| 4,566,571 A | * | 1/1986 | Fujioka | F16H 57/08 192/48.8 |
| 4,623,055 A | * | 11/1986 | Ohkubo | F16D 25/0638 192/52.4 |
| 6,920,971 B2 | * | 7/2005 | Creger | F16D 25/0638 192/85.41 |
| 10,293,674 B1 | * | 5/2019 | Wilton | B60K 6/36 |
| 2002/0162721 A1 | * | 11/2002 | Savoyard | F16D 13/644 192/70.12 |
| 2009/0114501 A1 | * | 5/2009 | Goto | F16D 13/70 192/89.22 |
| 2018/0099563 A1 | * | 4/2018 | Nozu | F16D 27/115 |
| 2022/0186788 A1 | * | 6/2022 | Van Dingenen | F16D 13/74 |

FOREIGN PATENT DOCUMENTS

| | | | | |
|---|---|---|---|---|
| CN | 113323997 A | * | 8/2021 | ............. B60K 17/08 |
| DE | 102016223033 A1 | * | 5/2018 | ............. F16D 13/52 |
| EP | 0102037 A2 | * | 3/1984 | ............. F16D 25/12 |
| JP | 2004205027 A | * | 7/2004 | ............. F16D 21/06 |

* cited by examiner

*Primary Examiner* — Stacey A Fluhart
(74) *Attorney, Agent, or Firm* — CANTOR COLBURN LLP

(57) ABSTRACT

An electric vehicle transmission includes a housing, a first gear, a second gear, and a first clutch pack supported in the housing. A first actuator is arranged in the housing. The first actuator is coupled with a first actuator member. A second actuator is arranged in the housing. The second actuator is coupled with a second actuator member. A modular actuation system is mounted to the housing. The modular actuation system includes a first energizer member and a second energizer member. The first energizer member is operatively connected to the first actuator and is operable to engage the first gear and the second energizer member is operatively connected to the second actuator and is operable to engage the second gear.

20 Claims, 5 Drawing Sheets

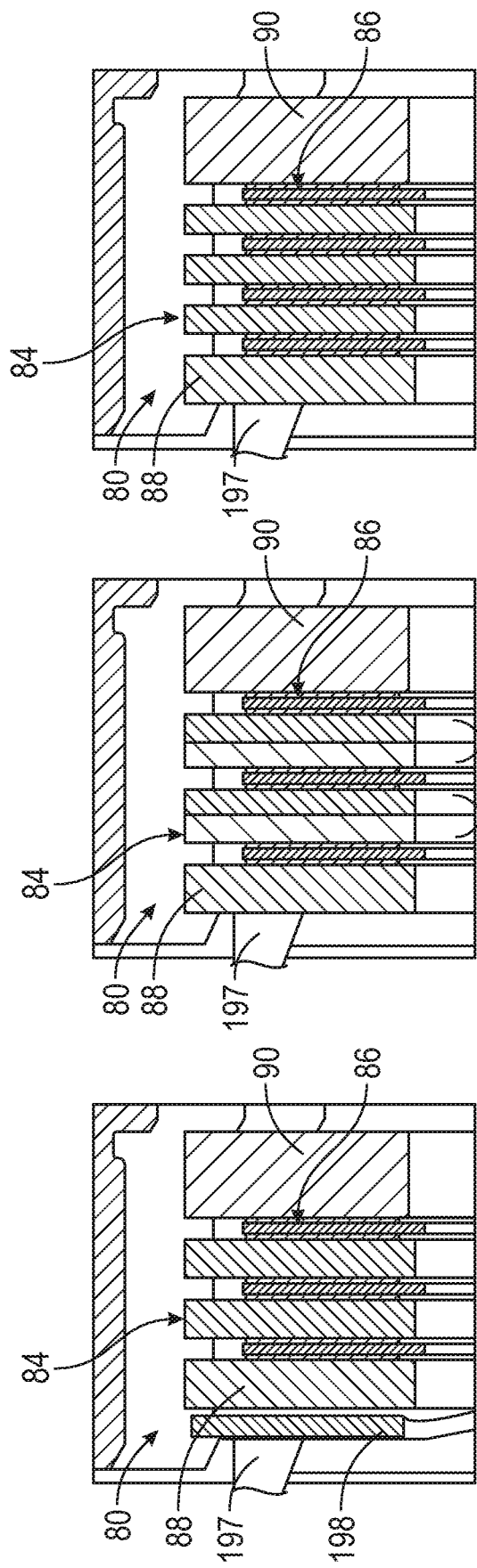

MODULAR ACTUATION SYSTEM FOR AN ELECTRIC VEHICLE TRANSMISSION

INTRODUCTION

The subject disclosure relates to the art of vehicles and, more particularly, to a pump drive architecture for an automatic transmission.

In an automatic transmission, a pump is used to pressurize and direct hydraulic fluid. The hydraulic fluid may be used to activate clutches which, in turn, stop or release gears to provide power to portions of a vehicle drive train. Typically, the pump is driven by a torque converter which is mounted to a fly wheel, and driven by, a vehicle engine. The flywheel includes gearing that interacts with a starter to initiate operation of the vehicle.

Many electric vehicles include a flywheel in order to accommodate legacy transmissions. Removing or redesigning the flywheel could increase an operational efficiency of the electric motor. However, without the flywheel mounting a pump (torque converter) creates a design challenge and without the torque converter, the source of pressurized fluid used to operate the automatic transmission disappears. Accordingly, the industry would welcome a system for providing pressurized fluid to an automatic transmission for an electric vehicle.

SUMMARY

An electric vehicle transmission in accordance with a non-limiting example includes a housing, and a geartrain arranged in the housing. The geartrain includes at least a first gear and a second gear. A first clutch pack is supported in the housing. The first clutch pack is operatively associated with the first gear. A second clutch pack is supported in the housing. The second clutch pack is operatively associated with the second gear. A first actuator is arranged in the housing. The first actuator is coupled with a first actuator member operable to engage the first clutch pack. A second actuator is arranged in the housing. The second actuator is coupled with a second actuator member operable to engage the second clutch pack. A modular actuation system is mounted to the housing. The modular actuation system includes a first energizer member and a second energizer member. The first energizer member is operatively connected to the first actuator and is operable to engage the first gear and the second energizer member is operatively connected to the second actuator and is operable to engage the second gear.

In addition to one or more of the features described herein a first plurality of compliant elements coupled with the first energizer member.

In addition to one or more of the features described herein a second plurality of compliant elements coupled with the second energizer member.

In addition to one or more of the features described herein the first actuator comprises a first piston including a first radially extending wall member, the first plurality of compliant elements being arranged between the first radially extending wall member and the first actuator member.

In addition to one or more of the features described herein the second actuator comprises a second piston supporting an activation finger, the second plurality of compliant elements being arranged between the second actuator member and the activation finger.

In addition to one or more of the features described herein the activation finger extends through the first clutch pack to selectively engage the second clutch pack.

In addition to one or more of the features described herein the at least one of the first clutch pack and the second clutch pack includes a plurality of reaction plates, and a friction disc disposed between adjacent ones of the plurality of reaction plates.

In addition to one or more of the features described herein the at least one of the first clutch pack and the second clutch pack includes a wave plate arranged adjacent to one of the plurality of reaction plates.

In addition to one or more of the features described herein the at least one of the first clutch pack and the second clutch pack includes a first support member and a second support member, the plurality of reaction plates and the friction disc disposed between the first support member and the second support member.

In addition to one or more of the features described herein at least one of the plurality of reaction plates comprises two stacked reaction plates.

An electric vehicle, in accordance with a non-limiting example, includes a body defining in part a passenger compartment. An electric motor is supported relative to the body. A rechargeable energy storage system is electrically connected to the electric motor. A transmission is coupled to the electric motor. The transmission includes a housing, and a geartrain arranged in the housing. The geartrain includes at least a first gear and a second gear. A first clutch pack is supported in the housing. The first clutch pack is operatively associated with the first gear. A second clutch pack is supported in the housing. The second clutch pack is operatively associated with the second gear. A first actuator is arranged in the housing. The first actuator is coupled with a first actuator member operable to engage the first clutch pack. A second actuator is arranged in the housing. The second actuator is coupled with a second actuator member operable to engage the second clutch pack. A modular actuation system is mounted to the housing. The modular actuation system includes a first energizer member and a second energizer member. The first energizer member is operatively connected to the first actuator and is operable to engage the first gear and the second energizer member is operatively connected to the second actuator and is operable to engage the second gear.

In addition to one or more of the features described herein a first plurality of compliant elements coupled with the first energizer member.

In addition to one or more of the features described herein a second plurality of compliant elements coupled with the second energizer member.

In addition to one or more of the features described herein the first actuator comprises a first piston including a first radially extending wall member, the first plurality of compliant elements being arranged between the first radially extending wall member and the first actuator member.

In addition to one or more of the features described herein the second actuator comprises a second piston supporting an activation finger, the second plurality of compliant elements being arranged between the second actuator member and the activation finger.

In addition to one or more of the features described herein the activation finger extends through the first clutch pack to selectively engage the second clutch pack.

In addition to one or more of the features described herein the at least one of the first clutch pack and the second clutch pack includes a plurality of reaction plates, and a friction disc disposed between adjacent ones of the plurality of reaction plates.

In addition to one or more of the features described herein the at least one of the first clutch pack and the second clutch pack includes a wave plate arranged adjacent to one of the plurality of reaction plates.

In addition to one or more of the features described herein the at least one of the first clutch pack and the second clutch pack includes a first support member and a second support member, the plurality of reaction plates and the friction disc disposed between the first support member and the second support member.

In addition to one or more of the features described herein at least one of the plurality of reaction plates comprises two stacked reaction plates.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5A is a cross-sectional side view of a clutch plate assembly of the electric vehicle transmission of FIG. 2, in accordance with a non-limiting example;

FIG. 5B is a cross-sectional side view of a clutch plate assembly of the electric vehicle transmission of FIG. 2, in accordance with another non-limiting example; and FIG. 5C is a cross-sectional side view of a clutch plate assembly of the electric vehicle transmission of FIG. 2, in accordance with yet another non-limiting example.

DETAILED DESCRIPTION

Figure 1:
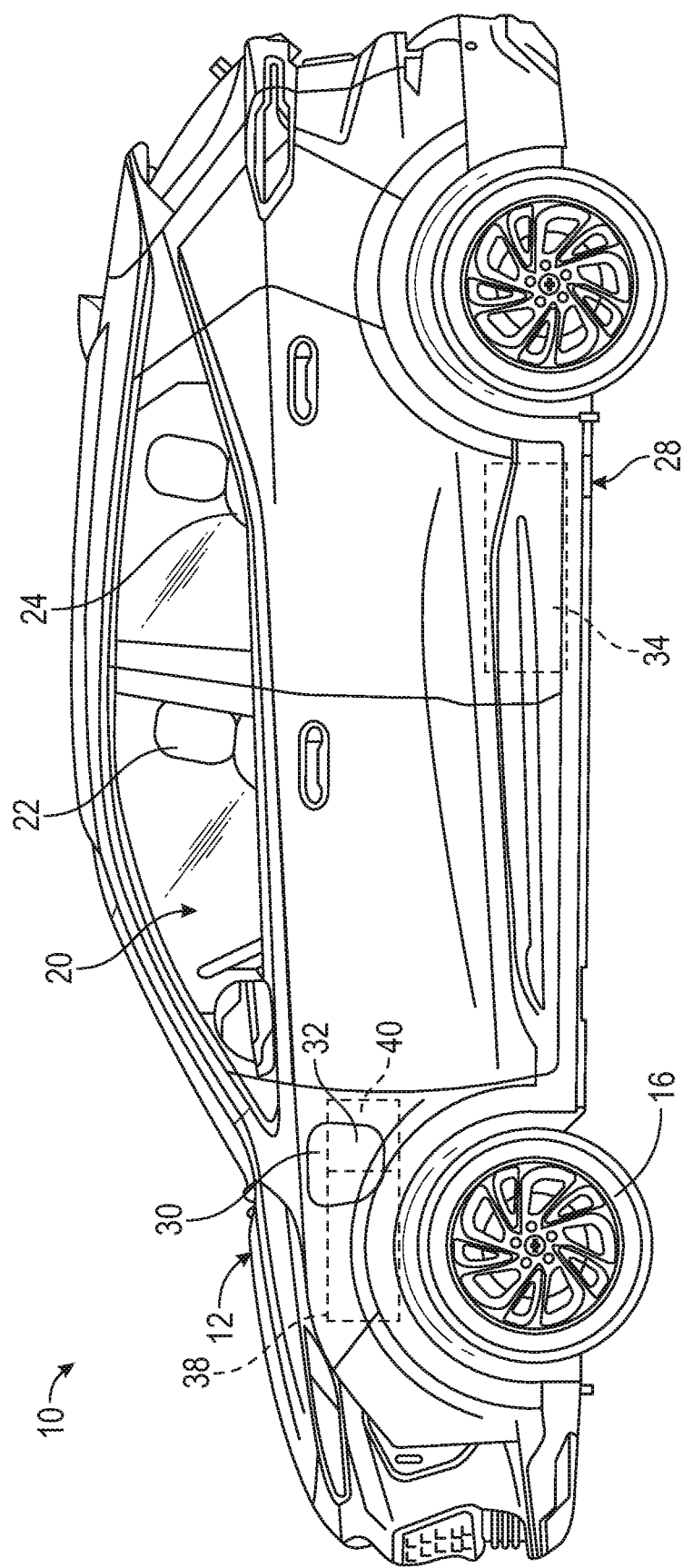
FIG. 1 is a left side view of a vehicle including a transmission having a modular actuation system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a frame (not shown) and a plurality of wheels, one of which is indicated at 16. Body 12 includes a passenger compartment 20 that includes a driver's seat 22 and at least one rear passenger seat 24. Vehicle 10 takes the form of an electric vehicle (EV) 28 including a charge port 30 having a door 32 that is selectively pivotally mounted to body 12. Charge port 30 includes a charge port receptacle (not shown) that serves as an interface between an external charging device (also not shown) and a rechargeable energy storage system (RESS) 34 supported in body 12. RESS 34 is connected to an electric motor 38 that is activated to provide power to one or more of the plurality of wheels 16 through a transmission 40.

Figure 2:
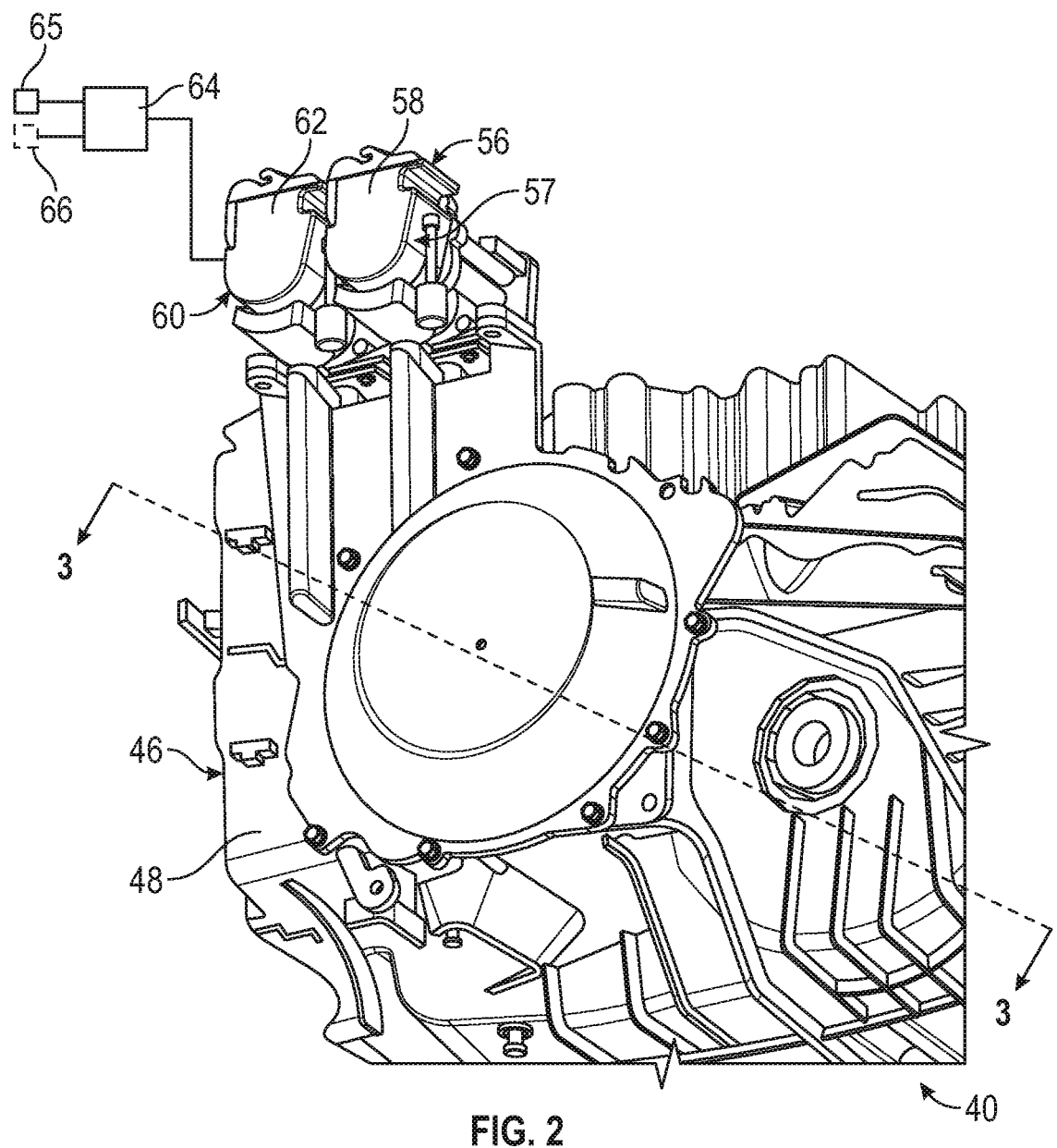
FIG. 2 is a perspective view of a portion of an electric vehicle transmission supporting the modular actuation system, in accordance with a non-limiting example.
Figure 3:
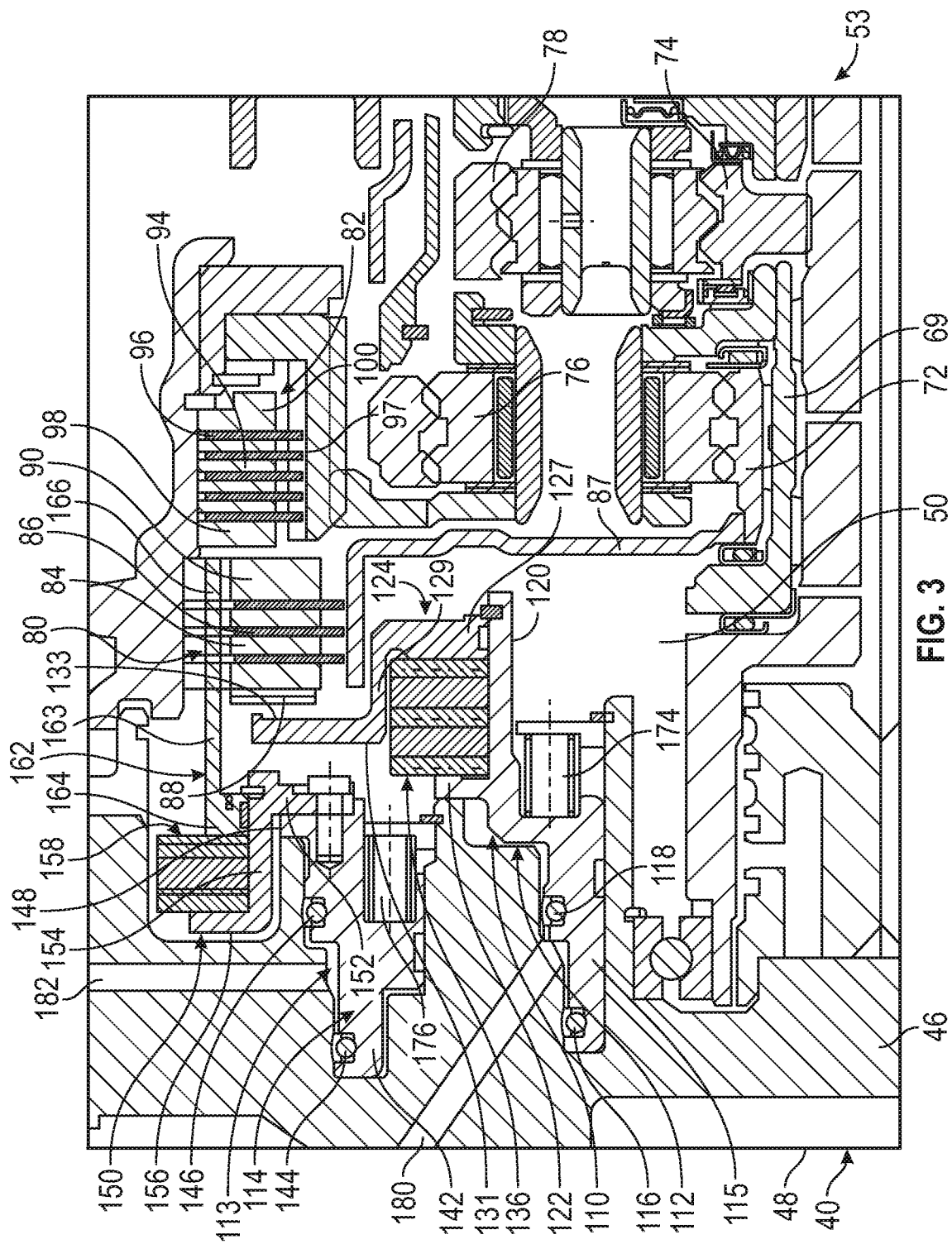
FIG. 3 is a cross-sectional side view of the electric vehicle transmission showing first and second piston actuators taken through the line 3-3 in FIG. 2.

Referring to FIGS. 2 and 3 and with continued reference to FIG. 1, transmission 40 includes a housing 46 having an exterior surface 48 and an interior 50 (FIG. 3). A geartrain, indicated generally at 53, is disposed within interior 50. Geartrain 53 acts as an interface between electric motor 38 and one or more of the plurality of wheels 16. That is, geartrain 53, in response to acceleration inputs, adjusts various gear ratios in order to establish a selected speed of vehicle 10. In a non-limiting example, transmission 40 includes a modular actuation system 56 mounted to exterior surface 48 of housing 46.

In a non-limiting example, modular actuation system 56 supports a first energizer member 57 shown in the form of a first pump 58 and a second energizer member 60 shown in the form of a second pump 62 that, when activated, introduce fluid into transmission 40 in order to establish a selected gear ratio for geartrain 53 as will be detailed more fully herein. That is, first pump 58 and second pump 62 are connected to a vehicle controller 64 (FIG. 2). Vehicle controller 64 is also coupled to an accelerator pedal 65 in passenger compartment 20. Alternatively, vehicle controller 64 may form part of an autonomous control system 66 that controls vehicle speed. In response to requested speed changes, be they from an accelerator pedal 65 or the autonomous controller, first pump 58 and/or second pump 62 delivers pressurized fluid into transmission 40 in order to establish a selected gear ratio of geartrain 53. It should be further understood that while first energizer member 57 and second energizer member 60 are shown and described as driving a fluid (i.e., pumps) other energizer systems, including mechanical systems such as motors may be employed.

With continued reference to FIG. 3, in a non-limiting example, geartrain 53 includes a shaft 69 supporting a first gear 72 and a second gear 74. First gear 72 may interact with a first speed gear 76 rotatably supported in interior 50. Second gear 74 may interact with a second speed gear 78 rotatably supported in interior 50. The particular interactions between first gear 72 and first speed gear 76 and/or second gear 74 and second speed gear 78 is controlled by an application of pressure to a first clutch pack 80 and/or a second clutch pack 82 arranged in interior 50.

In a non-limiting example, first clutch pack 80 includes a first plurality of reaction plates 84 and a first plurality of friction discs 86 supported on a first rotatable carrier 87 and disposed between adjacent ones of the first plurality of reaction plates 84. First plurality of reaction plates 84 are arranged between a first support member 88 and a second support member 90. First speed gear 76 may be actuated by shifting first support member 88 toward second support member 90 causing first rotatable carrier 87 to lock up from an interaction between first plurality of reaction plates 84 and first plurality of friction discs 86.

In a non-limiting example, second clutch pack 82 includes a second plurality of reaction plates 94 and a second plurality of friction discs 96 supported on a second rotatable carrier 97 and disposed between adjacent ones of the second plurality of reaction plates 94. Second plurality of reaction plates 94 are arranged between a first support member element 98 and a second support member element 100. Second speed gear 78 may be actuated by shifting first support member element 98 toward second support member element 100 causing second rotatable carrier 97 to lock up from an interaction between second plurality of reaction plates 94 and second plurality of friction discs 96.

Figure 4:
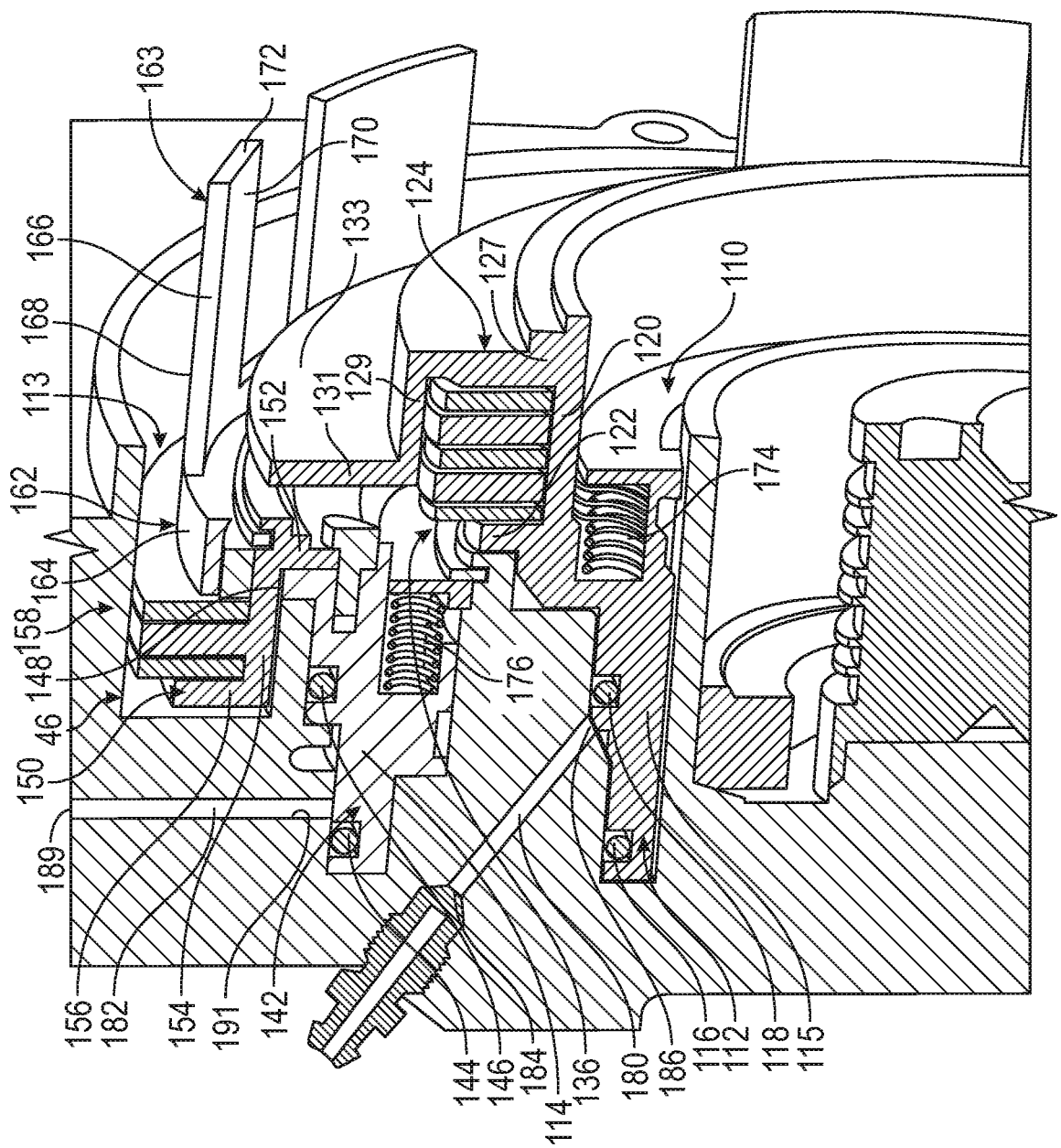
FIG. 4 is a perspective view of a portion of the first and second piston actuators of FIG. 3.

Reference will follow with reference to FIG. 4 and continued reference to FIG. 3. In accordance with a non-limiting example, transmission 40 includes a first actuator 110 shown in the form of a first piston 112 operatively associated with first clutch pack 80 and a second actuator 113 shown in the form of a second piston 114 operatively associated with second clutch pack 82. First piston 112 and second piston 114 are moveably mounted in housing 46. In a non-limiting example, second piston 114 is arranged radially outwardly of first piston 112. At this point, it should be understood that the use of pistons is but one non-limiting example, first actuator 110 and second actuator 113 may take on various forms including pneumatically driven and mechanically driven elements.

First piston 112 includes a central support 115 that is provided with a first seal 116 and a second seal 118. Central support 115 is slidable relative to housing 46 as will be detailed herein. First piston 112 is further shown to include an annular support surface 120 including a first radially extending wall member 122 and a first actuator member 124. First actuator member 124 includes a first portion 127 that extends from annular support surface 120, a second portion 129 that extends substantially perpendicularly from first portion 127 and a third portion 131 that extends substantially perpendicularly from second portion 129 and includes an actuator surface 133. Actuator surface 133 is configured to engage first clutch pack 80 when first piston 112 is shifted outwardly.

A first plurality of compliant elements 136 are mounted to first piston 112 between annular support surface 120 and second portion 129 of first actuator member 124. First plurality of compliant elements 136 control an application force imparted to first clutch pack 80 from first actuator member 124. Adjusting the arrangement and type of compliant elements may control application pressure and, as a result, gear changes of transmission 40.

In a non-limiting example, second piston 114 includes a second central support 142 provided with a first seal element 144 and a second seal element 146. An annular support surface portion 148 projects radially outwardly of second central support 142. A second actuator member 150 is connected to annular support surface portion 148. Second actuator member 150 is arranged so as to apply an activation force to second clutch pack 82 when second piston 114 is actuated. In accordance with a non-limiting example, second actuator member 150 includes a first section 152 coupled to second piston 114, a second section 154 that extends substantially perpendicularly relative to first section 152, and a third section 156 that extends substantially perpendicularly relative to and radially outwardly of second section 154. A second plurality of compliant elements 158 is arranged on second section 154.

An actuation finger assembly 162 is coupled to second actuator member 150 at second section 154. Actuation finger assembly 162 includes a plurality of actuation fingers, one of which is indicated at 163, each having a first end 164 shiftably mounted to second section 154, and a second end 166 having an annular outer surface 168, an annular inner surface 170, and an end section 172. Actuation fingers 163 extend through first clutch pack 80 such that end section 172 may selectively engage second clutch pack 82 as will be detailed herein.

A first return spring 174 is arranged radially inwardly of annular support surface 120. First return spring 174 urges or biases first piston 112 back to a home position (FIG. 3) when application pressure is removed. A second return spring 176 is disposed between housing 46 and second piston 114. In a manner similar to that discussed herein, second return spring 176 urges or biases first piston 112 back to a home position (FIG. 3) when application pressure is removed.

In accordance with a non-limiting example, housing 46 includes a first fluid passage 180 that fluidically connects first pump 58 with first piston 112 and a second fluid passage 182 that fluidically connects second pump 62 and second piston 114. First fluid passage 180 includes a first end 184 fluidically connected to first pump 58 and a second end 186 that terminates at first piston 112 between first seal 116 and second seal 118. Second fluid passage 182 includes a first end portion 189 fluidically connected to second pump 62 and a second end portion 191 that terminates at second piston 114 between first seal element 144 and second seal element 146.

In a non-limiting example, changes in acceleration signals received by vehicle controller 64 through, for example, accelerator pedal 65, are employed to activate, for example, first pump 58. First pump 58 delivers a pressurized fluid into first fluid passage 180 causing first piston 112 to shift. First actuator member 124 engages and activates first clutch pack 80. Fluid pressure may be increased to selectively engages one or more of the first plurality of friction discs 86 to establish a selected vehicle speed. First plurality of compliant elements 136 control how force is applied to first clutch pack 80 through first actuator member 124. Controlling applied force to first clutch pack 80 ensures steady and accurate gear changes through first speed range. As such, the particular makeup, (i.e., construction, materials, order of components and such) of the first plurality of compliant elements 136 may vary and could be tailored to vehicle size, vehicle power, desired driving characteristics and/or the like.

In a non-limiting example, as vehicle 10 reaches an end of the first speed range, vehicle controller 64 may signal first pump 58 to alleviate applied pressure allowing first return spring 174 to disengage first piston 112. At the second time, vehicle controller 64 activates second pump to deliver a pressurized fluid into second fluid passage 182 causing second piston 114 to shift. Second actuator member 150 through actuation finger assembly 162 engages and activates second clutch pack 82. Fluid pressure may be increased with pressure application being controlled by the second plurality of compliant elements 158 to selectively engage one or more of the second plurality of friction discs 96 to establish a selected vehicle speed in a second speed range.

Second plurality of compliant elements 158 control how force is applied to second clutch pack 82 in a manner similar to that discussed above with respect to first clutch pack 80. Second piston 114 shifts outwardly driving actuation finger assembly 162 through second clutch pack 82. When end section 172 engages second clutch pack 82, a reaction force is passed through second plurality of compliant elements 158 so as to control applied force. Controlling applied force to second clutch pack 82 ensures steady and accurate gear changes through the second speed range. As such, the particular makeup of the second plurality of compliant elements 158 may vary and could be tailored to vehicle size, vehicle power, desired driving characteristics and/or the like.

In addition to controlling clutch application through design of the first and/or second pluralities of compliant elements 136 and/or 158, application characteristics may be controlled by adjusting various characteristics of first and/or second clutch pack 80 and/or 82. Reference will follow to FIG. 5A in describing first clutch pack 80 in accordance with a non-limiting example. It should be understood that second clutch pack 82 may be similarly formed or, if different application characteristics are desired, may have a different construction. In the non-limiting example shown, first plurality of reaction plates 84 are coupled to a clutch support 197 of housing 46.

A wave plate 198 is arranged adjacent to first support member 88. Wave plate 198 reacts to applied force in order to temper force applied to first clutch pack 80 to engage the first plurality of friction discs 86. FIG. 5B shows the first plurality of reaction plates 84 being formed from two stacked reaction plates 206. FIG. 5C shows the addition of a friction disc to the first plurality of friction discs 86. The particular construction of each clutch pack may vary and may be tailored to desired application force characteristics in order to reach to higher energy applications, or to control high torque high energy pressure applications.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric vehicle transmission comprising:
   a housing;
   a geartrain arranged in the housing, the geartrain including at least a first gear and a second gear;
   a first clutch pack supported in the housing, the first clutch pack being operatively associated with the first gear;
   a second clutch pack supported in the housing, the second clutch pack being operatively associated with the second gear;
   a first actuator arranged in the housing, the first actuator being coupled with a first actuator member operable to engage the first clutch pack;
   a second actuator arranged in the housing, the second actuator being coupled with a second actuator member operable to engage the second clutch pack;
   a modular actuation system mounted to the housing, the modular actuation system including a first energizer member and a second energizer member, the first energizer member being operatively connected to the first actuator and operable to engage the first gear and the second energizer member being operatively connected to the second actuator and operable to engage the second gear; and
   a first plurality of compliant elements coupled with the first energizer member.

2. The electric vehicle transmission according to claim 1, further comprising a second plurality of compliant elements coupled with the second energizer member.

3. The electric vehicle transmission according to claim 2, wherein the first actuator comprises a first piston including a first radially extending wall member, the first plurality of compliant elements being arranged between the first radially extending wall member and the first actuator member.

4. The electric vehicle transmission according to claim 2, wherein the second actuator comprises a second piston supporting an activation finger, the second plurality of compliant elements being arranged between the second actuator member and the activation finger.

5. The electric vehicle transmission according to claim 4, wherein the activation finger extends through the first clutch pack to selectively engage the second clutch pack.

6. The electric vehicle transmission according to claim 1, wherein the at least one of the first clutch pack and the second clutch pack includes a plurality of reaction plates, and a friction disc disposed between adjacent ones of the plurality of reaction plates.

7. The electric vehicle transmission according to claim 6, wherein the at least one of the first clutch pack and the second clutch pack includes a wave plate arranged adjacent to one of the plurality of reaction plates.

8. The electric vehicle transmission according to claim 6, wherein the at least one of the first clutch pack and the second clutch pack includes a first support member and a second support member, the plurality of reaction plates and the friction disc disposed between the first support member and the second support member.

9. The electric vehicle transmission according to claim 6, wherein at least one of the plurality of reaction plates comprises two stacked reaction plates.

10. The electric vehicle transmission according to claim 1, further comprising a vehicle controller operatively connected to the modular activation system, the vehicle controller selectively controlling the modular activation system to selectively control the first energizer member and the second energizer member.

11. An electric vehicle comprising:
    a body defining in part a passenger compartment;
    an electric motor supported relative to the body;
    a rechargeable energy storage system electrically connected to the electric motor; and
    a transmission comprising:
    a housing;
    a geartrain arranged in the housing, the geartrain including at least a first gear and a second gear;
    a first clutch pack supported in the housing, the first clutch pack being operatively associated with the first gear;
    a second clutch pack supported in the housing, the second clutch pack being operatively associated with the second gear;

a first actuator arranged in the housing, the first actuator being coupled with a first actuator member operable to engage the first clutch pack;

a second actuator arranged in the housing, the second actuator being coupled with a second actuator member operable to engage the second clutch pack;

a modular actuation system mounted to the housing, the modular actuation system including a first energizer member and a second energizer member, the first energizer member being operatively connected to the first actuator and operable to engage the first gear and the second energizer member being operatively connected to the second actuator and operable to engage the second gear; and a first plurality of compliant elements supported by the first energizer member.

12. The electric vehicle according to claim 11, further comprising a second plurality of compliant elements coupled with the second energizer member.

13. The electric vehicle according to claim 12, wherein the first actuator comprises a first piston including a first radially extending wall member, the first plurality of compliant elements being arranged between the first radially extending wall member and the first actuator member.

14. The electric vehicle according to claim 12, wherein the second actuator comprises a second piston supporting an activation finger, the second plurality of compliant elements being arranged between the second actuator member and the activation finger.

15. The electric vehicle according to claim 14, wherein the activation finger extends through the first clutch pack to selectively engage the second clutch pack.

16. The electric vehicle according to claim 11, wherein the at least one of the first clutch pack and the second clutch pack includes a plurality of reaction plates, and a friction disc disposed between adjacent ones of the plurality of reaction plates.

17. The electric vehicle according to claim 16, wherein the at least one of the first clutch pack and the second clutch pack includes a wave plate arranged adjacent to one of the plurality of reaction plates.

18. The electric vehicle according to claim 16, wherein the at least one of the first clutch pack and the second clutch pack includes a first support member and a second support member, the plurality of reaction plates and the friction disc disposed between the first support member and the second support member.

19. The electric vehicle according to claim 16, wherein at least one of the plurality of reaction plates comprises two stacked reaction plates.

20. The electric vehicle according to claim 11, further comprising a vehicle controller operatively connected to the modular activation system, the vehicle controller selectively controlling the modular activation system to selectively control the first energizer member and the second energizer member.

* * * * *